Dec. 23, 1969
R. MACKO
3,486,092
CONTROL APPARATUS FOR AUTOMATIC WAREHOUSE SYSTEM
Filed July 11, 1966
4 Sheets-Sheet 3
FIG. 3A
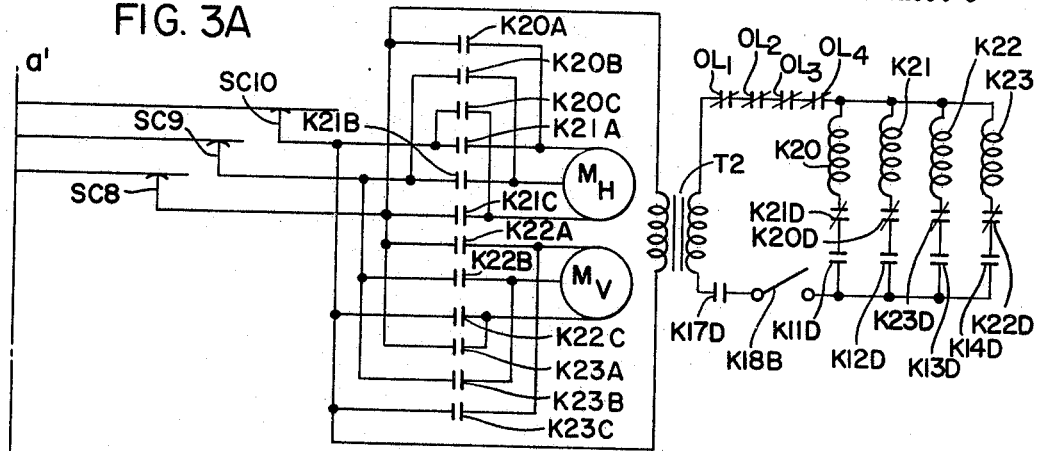
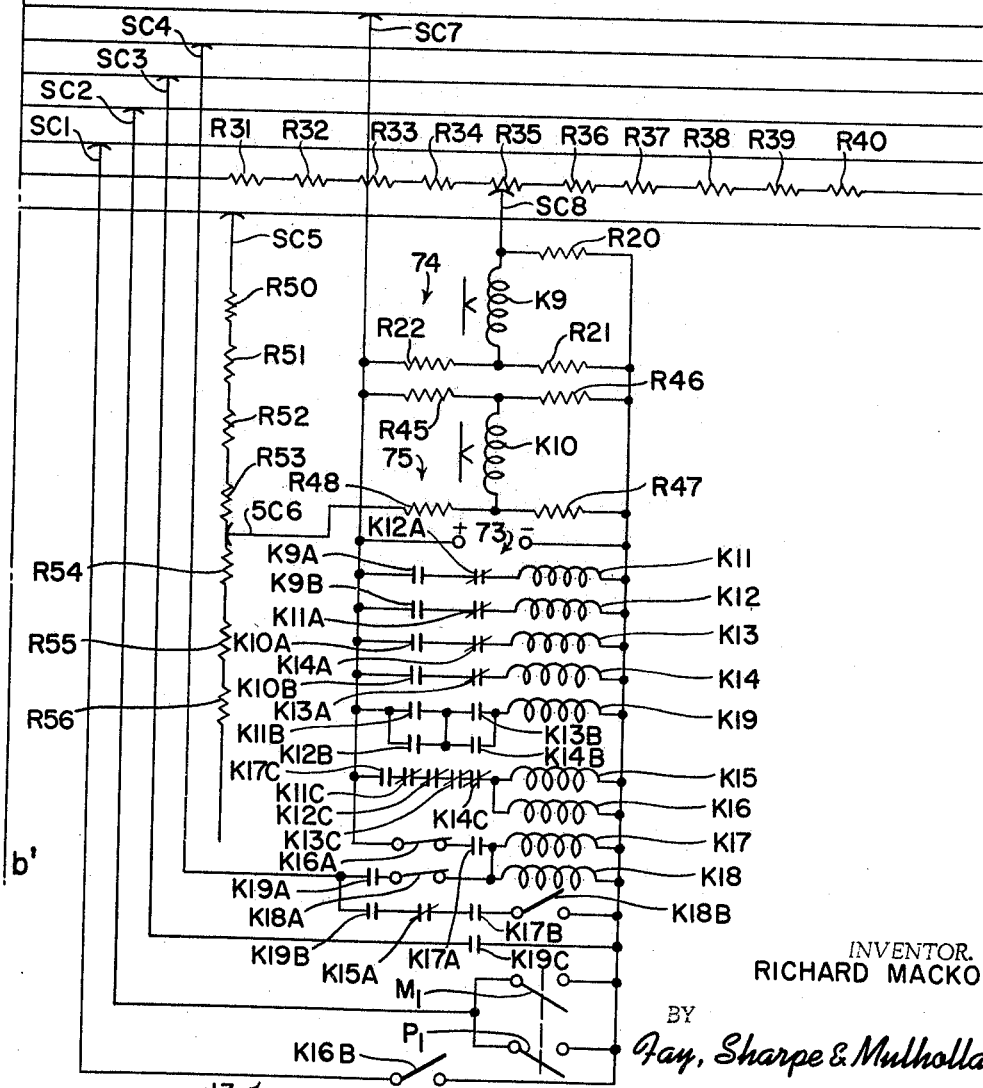
INVENTOR.
RICHARD MACKO
BY
*Fay, Sharpe & Mulholland*
ATTORNEYS Dec. 23, 1969   R. MACKO   3,486,092
CONTROL APPARATUS FOR AUTOMATIC WAREHOUSE SYSTEM
Filed July 11, 1966   4 Sheets-Sheet 4

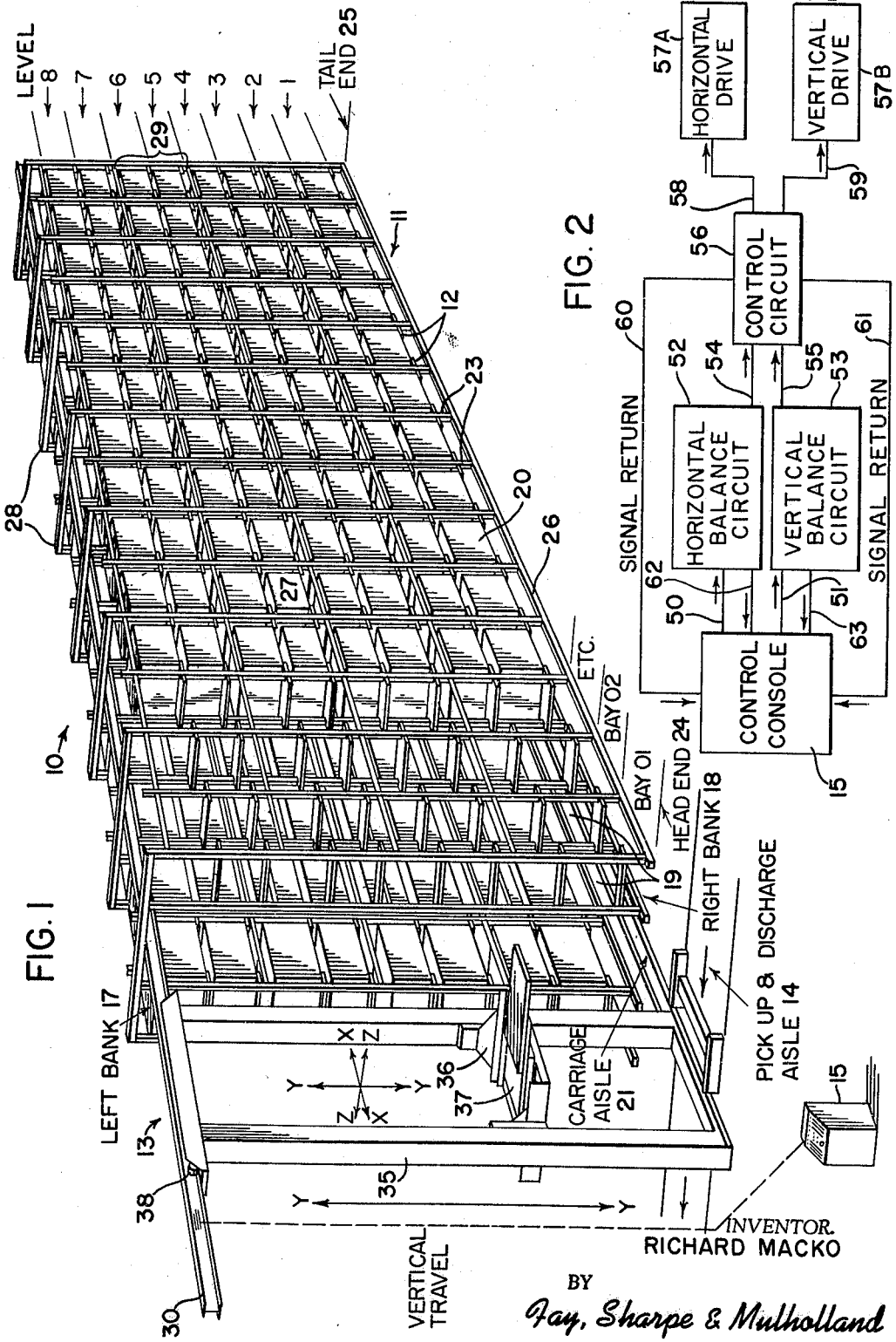

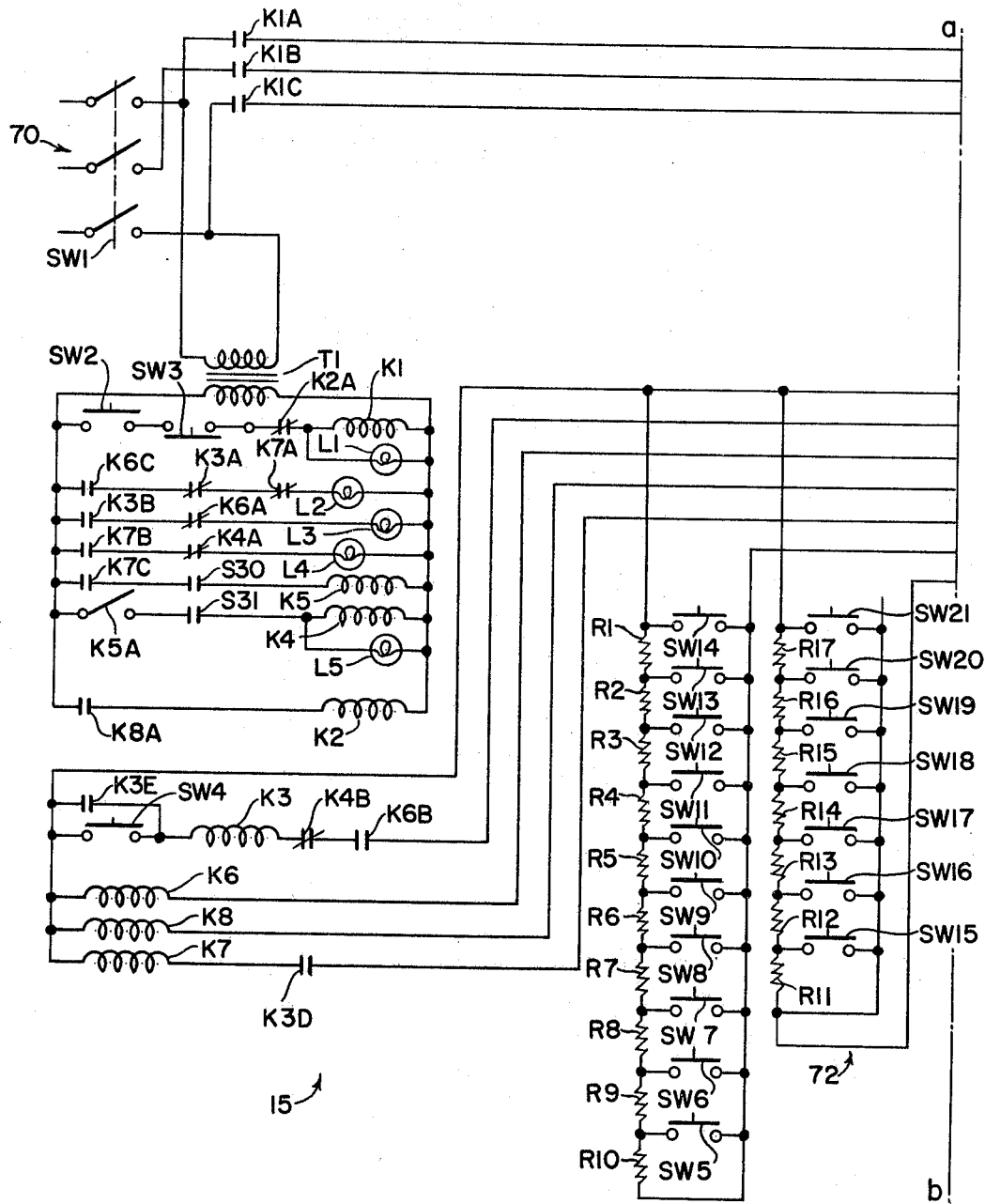

INVENTOR.
RICHARD MACKO
BY
Fay, Sharpe & Mulholland
ATTORNEYS

United States Patent Office 3,486,092
Patented Dec. 23, 1969

3,486,092
CONTROL APPARATUS FOR AUTOMATIC
WAREHOUSE SYSTEM
Richard Macko, Avon, Ohio, assignor to Symco Enterprises, Inc., Independence, Ohio, a corporation of Ohio
Filed July 11, 1966, Ser. No. 564,068
Int. Cl. H02p 1/54, 5/46, 7/68
U.S. Cl. 318—18                           15 Claims

ABSTRACT OF THE DISCLOSURE

Means are disclosed for remotely controlling the position of a mobile carrier which include a bridge network for each of the horizontal and vertical positions of the carrier. The control means include a bridge network having at least two adjacent legs of fixed resistance and a leg of variable resistance. In one embodiment, a leg includes a push-button arrangement located at a position remote from the carrier. The resistance in the leg remote from the carrier is changed in accordance with the desired position of the carrier. When the variable resistance leg is actuated, polarity sensitive means on the carrier responds to the unbalance of the bridge and initiates movement of the carrier through appropriate circuit means in accordance with the polarity across the polarity-sensing means. Additional means are provided for varying the resistance in one of the variable legs of resistance in the bridge as a function of the position of the carrier. The resistance is varied in a manner which tends to return the bridge to balance, whereupon the movement of the carrier ceases. In one embodiment, variable resistance legs are provided at a remote location for controlling both the horizontal and vertical movement of the carrier. In another embodiment, three legs of the mobile carrier may be of fixed resistance and the fourth or variable leg may include two variable resistance portions. The first portion is changed in accordance with the desired location of the carrier and the travel of the carrier changes the second portion of the variable leg in a manner which tends to return the bridge to balance. Circuit and positioning means for achieving the desired movement of the carrier are also disclosed.

---

This invention relates to automatic warehousing systems and particularly to means for controlling the positioning of a mobile carrier in such a system. More particularly, this invention relates to means utilizing a balanced bridge principle in automated warehousing systems for remotely controlling a mobile carrier.

Prior art automated warehousing systems are known which effectively utilize various designs for horizontal and vertical positioning of a mobile carrier for automated storage of goods. Generally, such automated warehousing systems comprise four basic system components; namely, the storage system, generally including a system of storage racks; means for pick-up and deposit of the goods; means for transporting the goods to a preselected location in a storage means; and means for controlling the position of the transporting means.

One of the simpler methods for movement and storage of goods in a storage system is by constant supervision of an operator, utilizing a fork operated truck, or by the use of several operators to control the transporting means by utilizing overhead or floor-mounted stacker cranes for movement and storage of the goods. Such means have proved to be inadequate due to the requirements of constant attendance by one or more operators and the restrictions necessarily incumbent thereto with respect to speed of handling.

Another example of an automatic warehousing system which has proved to be unsatisfactory is a system utilizing a plurality of conveyors within a storage rack system for convenient manipulation of goods at or near the height of a single operator. Such systems have included various elevator devices for effective vertical translation of the goods to the storage area desired.

Prior art systems have sought to overcome the limitations of the heretofore discussed systems by more fully automating the warehousing systems with a view toward minimizing the requirement of human attendance in the system and maximizing efficient use of available space and speed of handling the stored goods. Elimination or minimization of the present operators in these systems has prompted increased recognition of problems associated with automatically controlling the position of a carrier. Heretofore, control systems of the type contemplated have utilized various means for pre-selecting a position of the mobile carrier. For example, one known prior system utilizes a means for counting the number of bays traversed by the mobile carrier, both horizontally and vertically, to reach the desired position. Similarly, mobile carriers have been provided with a sensing means, for example, a photoelectric scanner, to detect movement of the mobile carrier by sensing markers to energize the scanning means. The signals derived from the scanning means are used to uncount a preselected counter position to affect the positional control of the mobile carrier.

Still another prior art method of preaddressing the position of a mobile carrier similar to that described hereinabove, utilized a system of limit switches in a counting system wherein movement of the carriage actuates the limit switches to indicate the position of the carrier. Actuation of the limit switches may be used to generate a signal for control purposes to uncount the predetermined position programed for the mobile carrier. However, these prior art systems have proved unsatisfactory for several reasons. For example, the described prior art systems generally require a relatively large amount of sophisticated circuitry and are susceptible to inaccuracy prompted whenever the scanning means or limit switch actuation fails. When this occurs, the carrier will be moved to an erroneous position, determined by the number of errors in the system. Moreover, the mobile carrier in such counting arrangements generally returns to a predetermined, or home, position to reinitiate the counting mechanism. This requirement has prompted delays in the operation of the system during the return cycle.

The means according to the invention which seeks to overcome the shortcomings of the prior art utilizes a means for remotely controlling the position of a mobile carrier, including a bridge network for each of the horizontal and vertical positions of the carrier. In a preferred embodiment, the mobile carrier comprises a horizontal carriage suspended from a monorail. A carrier comprises a drive means capable of propelling the carrier horizontally within the storage system. The carrier further comprises means for vertically positioning the carrier according to the desired height of the ultimate storage area. In order to achieve a preselected vertical and horizontal position of the mobile carrier, means including a bridge network are provided wherein a fixed number of the legs of the bridge are fixed in magnitude. To achieve a horizontal position, a predetermined quantum of resistance is placed into a variable leg of the bridge at a remote console position thereby to effect an unbalance of the bridge. In response to an unbalance of the bridge network, a polarity-sensitive actuating means propels the carrier in a horizontal position along the storage system. A collector cooperating with a busbar comprising separated segments of a predetermined amount of resistance effectively either adds or deletes resistance in a variable leg of the bridge in accordance with the direction of unbalance corresponding to a predetermined horizontal position. Upon a balance of the bridge in the horizontal circuitry, the movement of the carrier ceases.

Simultaneously, in response to a predetermined vertical position placed into a variable leg of the vertical positioning bridge, movement of the carrier simultaneously seeks to balance the bridge at the desired vertical location in accordance with the circuitry which will hereinafter be explained in greater detail.

Accordingly, it is an object of this invention to provide means for preselecting a vertical and a horizontal position of a mobile carrier from a position remote from the carrier.

It is another object of this invention to provide a new and improved means for remotely controlling the position of the mobile carrier in an automated warehousing system which minimizes or eliminates the need for human operators.

It is another object of this invention to provide an improved control apparatus for a carrier in an automated warehousing system wherein the control means effect the storage and retrieval of objects from a storage means with a minimum or absence of attendance by a human operator.

It is another object of this invention to provide an automated warehousing system for automatic storage and retrieval of goods from a location remote from a control area and with minimum human attendance wherein said means includes a bridge network.

It is another object of this invention to provide an improved automated warehousing system for the storage and retrieval of goods wherein economic savings are realized due to a relaxation in the rigidity of environmental conditions due to elimination and minimization of the need for human operators.

It is still a further object of this invention to provide an automated warehousing system utilizing predetermined horizontally and vertically adjustable carriers designed to effectively utilize a minimum of space for maximum storage.

It is a more specific object of this invention to provide an improved automated warehousing apparatus comprising a mobile carrier which is positionably adjustable both horizontally and vertically, wherein means for controlling the position of said carrier utilizes a bridge network substantially mounted on said carrier.

It is still another object of this invention to provide means for controlling a remote carrier in an automated warehousing system wherein said means includes a bridge network having a fixed leg of the bridge mounted on a mobile carrier and a variable leg of the bridge comprising a plurality of resistance capable of selective insertion of an amount of resistance corresponding to the desired position of the mobile carrier into the variable leg of the bridge and wherein the second portion of the variable leg of the bridge comprises of a plurality of resistances physically separated along segments of a bus-bar.

It is another object of this invention to provide means for preaddressing the mobile carrier in an automated warehousing system at any point in the system, wherein the carrier is capable of response to said preaddress in either a forward or reverse, or upward or downward direction, thus obviating the necessity of returning the carrier to a reference position before responding to a command.

A still further object of this invention is to provide means for controlling the position of a mobile carrier in an automated warehousing system which is capable of optimizing travel during a plurality of command cycles by positioning the carrier in response to a command from either horizontal and either vertical direction.

It is another object of this invention to provide means for controlling the vertical position of the mobile carrier utilizing a bridge network, wherein a variable leg of the bridge comprises a remote variable resistance indicative of the desired elevation of the carrier, another portion of the leg comprising segments of resistance included on a bus bar mounted to a vertical mast of the carrier whereby the carrier in response to a command will move to the desired vertical position to effect a balance in the bridge.

It is a further object of this invention to provide control means for a mobile carrier in an automated warehousing system capable of preaddressing the vertical position of the carrier at any point along its vertical path.

It is a still further object of this invention to provide a carrier capable of response to a plurality of commands without the necessity of returning to a vertical reference position, or a starting point, before response to the commands.

It is a further object of this invention to provide means for control of the position of a mobile carrier which provides increased reliability in achieving the sought location by minimizing or eliminating the requirements for contact closures at each position in the system.

Other and more specific objects of the invention will be apparent in a detailed description to follow.

FIG. 1 is a perspective view of an automated warehousing system capable of effectively utilizing the control means according to the invention.

FIG. 2 is a block diagram of the control system according to the invention.

FIGS. 3 and 3A show a circuit diagram of one embodiment of a control means according to the invention wherein FIG. 3 illustrates the circuitry contained on the remote console, and FIG. 3A illustrates the circuitry contained on the mobile carrier.

Figure 4:
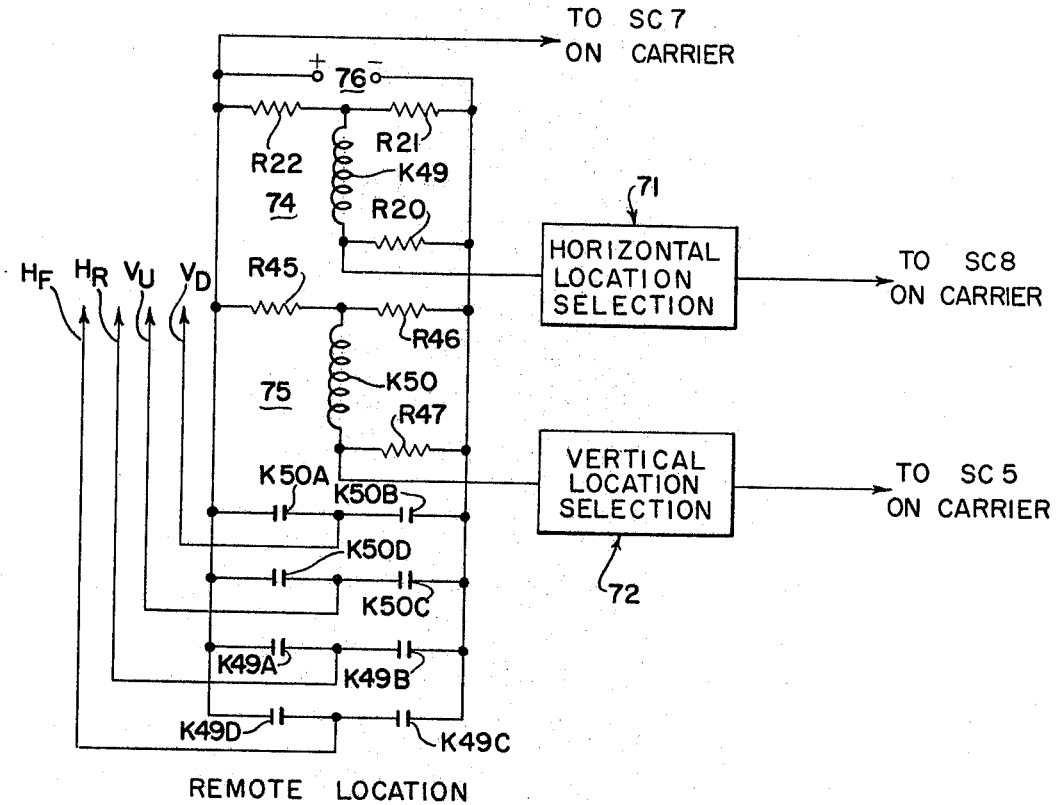
FIG. 4 and 4A are circuit diagrams, partially in block form, of an alternative embodiment of the control means according to the invention wherein much of the control circuitry is mounted on the remote console.

In FIG. 1 an automated warehousing system is shown generally at 10 comprising a storage area 11 including a network of storage racks 12. A mobile carrier, shown generally at 13, is capable of vertical and horizontal travel within storage area 11 for access to storage racks 12. A pick-up and discharge area for goods to be stored is shown at 14 and a control console for the automated warehouse system 10 is shown at 15.

The storage area 11 is shown as typically comprising a left bank 17 and a right bank 18, each bank comprising a plurality of volumes 19 horizontally and vertically spaced along each bank for storage of goods, for example, packaged goods 20 therein. A carriage aisle 21 is disposed between left bank 17 and right bank 18 of the storage area 11 for convenience of travel of the carrier therebetween and for access to each bank from a central location. It can be understood that the automated warehousing system 10 may be but a part of a plurality of such systems utilizing a rather extensive volume of storage area.

Typically, storage area 11 comprises a plurality of upright supports 23 spaced at horizontal increments along said carriage aisle 21. The spacing between the plurality of upright supports 23 may be determined by the anticipated size of the prospective stored goods 20 or according to the needs of the system. For convenience of description, the volume 19 formed between a particular pair of upright supports 23 is designated a bay, with a numerical designation indicating its relative position from the head end 24 to the tail end 25 of the storage area 11. Thus, bay 01 refers to the storage areas formed by the pair of uprights 23 most closely adjacent to head end 24. Thus, it is apparent that each bay represents a vertical column for storage of goods.

Each upright 23 may be conveniently supported or anchored to a base plate or base beam 26 for stability of the storage network and to prevent the shifting of the elements of the bank after alignment.

Shelves 12 are fixedly and spacedly mounted upon uprights 23 to form a plurality of elevational areas for storage. For convenience of description, each elevational area of storage has been designated by a numeral indicating the level. Thus, it is clear that the numeral 1 designates the elevational storage area most closely adjacent to the base plate 26 and conversely, elevational area 8 indicates, for the particular embodiment shown, the uppermost extent of the vertical elevation.

Thus, it can be seen that each of the particular storage volumes 19 may be conveniently designated by coordinates defined along the X and Y axis, indicating the ordinate and abscissa of a particular volume 19 according to its position from the head end 24 and the base 26. Thus, for example, numeral 27 indicates the goods stored at bay 05, level 5.

Shelves 12 may be cantilevered from the upright support 23 and do not necessarily occupy the entire distance between adjacent uprights 23. The space between adjacent shelves 12 may be free to permit the fork mechanism of the mobile carrier to deposit and retrieve the goods 20 within the volume without interference with structural members.

Where necessary, according to the needs of the system lateral supports 29 may be used at a predetermined number of elevations to aid in support of the upright 23 to maintain alignment after installation. It can be understood, of course, that the size, spacing and relationship of the structural members of the storage area 11 is, in part, determined by the size, weight, volume and the like of the goods 20 to be stored.

Structural headers 28 are suitably fastened to the upper portion of the left and right banks of storage. Headers 28 provide support and alignment of left blank 17 with respect to right bank 18 and in addition it may support a runway 30 which extends to the full length of the storage area 11 along aisle 21. Mobile carrier 13 may be suitably mounted on runway 30 for travel within or without the storage area 11, as will be discussed in greater detail.

The pick-up and discharge aisle 14 is shown diagrammatically as the initiating point for storage of goods within the system. In one embodiment, the pick-up and discharge aisle 14 may be used as an initiating point wherein all incoming loads of goods to be stored and deposited upon the mobile carrier 13 by manual operation, fork truck displacement, or other convenient means of conveyance. Aisle 14 may be provided with suitable guide members to assure positive positioning of the loads on the mobile carrier 13. As can be understood, the area may also serve as the repository for retrieved goods from the storage area 11. The pick-up and discharge areas may also be at opposite ends of the carriage aisle 21 anywhere in the system, or part of larger, more complex systems of material flow determined, in part, by the application.

The mobile carrier 13 comprises a horizontal carrier 35, a vertical carrier 36, and an extendible fork assembly 37. Horizontal carrier 35 transverses the storage area 11 along the X axis essentially in the X–Y plane. The horizontal carrier 35 may be suspended from the runway 30 and propelled by powered trolleys shown at 38, by rubber tires, or by other suitable means of propulsion known to the art. The means for propelling the horizontal carrier may be contained within the carrier and will be discussed in greater detail in connection with the discussion of the circuitry.

The power and control may be applied to the horizontal carrier 35 by a bus bar, a tag line, or an electrical umbilical arrangement, or by any means suitable for power or control transfer to the carrier. Vertical carrier 36 may be confined within horizontal carrier 35 of the mobile carrier 13 and capable of movement along the Y axis in the X–Y plane. The vertical carrier 36 may be positioned by a ram, hoist, chain and drive mechanism, or any other suitable means for movement of the vertical carrier. The movement of the vertical carrier responds to a command of the control console 15 to position the carrier at a predetermined level in the storage area 11.

The extendible fork assembly 37 may comprise any one of a plurality of known extendible fork assembly arrangements and for the embodiment shown, is extendible into both the left bank and right bank. One systems uses sections comprising primary and secondary forks. The primary fork is normally supported on the bed of the fork assembly 37 by guide rollers. The secondary fork is supported by the primary fork by means of suitable guides or restraining pads. The primary fork, in response to a command, is driven from the assembly 37 by means of a chain, rack and pinion assembly, gearing arrangement, or ram assembly. The telescopic fork assembly may extend fully into a storage volume 19 and withdraw the load 20 from the storage area 19 until the load is placed in a relatively centered position on the vertical carrier 36 whereupon the fork assembly collapses so that the goods are contained on the vertical carrier 30. Conversely, when storing loads 20 in preselected volumes 19, the fork assembly extends beneath the load, and retrieves it to center the load upon the vertical carriage during the travel period. Upon reaching the desired area, the fork assembly raises the load slightly and extends it to the storage area whereupon the fork assembly may lower slightly to deposit the load in the storage area for ultimate retrieval upon receipt of another command.

Means for preaddressing a desired location for storage or retrieval of a load may comprise a push-button address system mounted within control console 15. A typical cycle of operation for the system thus described comprises three basic types of automatic cycles; namely, the store cycle, the retrieve cycle, and a store-retrieve cycle. In the store cycle, a load 20 is conventionally received at the pick-up and discharge aisle 14, transferred to a preselected storage volume 19, deposited therein, whereupon the mobile carrier 13 returns to the head end 24 of the aisle.

In a retrieve cycle, the mobile carrier 13 responds in a manner similar to that hereinbefore outlined, except that the mobile carrier 13 moves directly to load 20, retrieves the load and returns the load to the pick-up and discharge aisle 14. In a store-retrieve cycle, the mobile carrier 13 first responds to the store address inserted in the control console and performs the store cycle as previously outlined. Upon completion of the store cycle, the mobile carrier 13 completes the retrieve cycle, as hereinbefore outlined. Thus, it is clear that FIG. 1 describes a conventional environment and a system of operation for an automated warehousing system particularly suited for application of means for controlling the position of the mobile carrier, including the horizontal carrier and the vertical carrier, according to the invention.

FIG. 2 depicts in block diagram form the control means according to the invention wherein a signal inserted at the control console 15 corresponding to the desired vertical and horizontal location of the mobile carrier 13 is transmitted via the suitable conductor means 50 and 51 to a horizontal balance circuit 52 and a vertical balance circuit 53 respectively. Conductor means 50 and 51 may be conventional conductors, bus bars, tag lines, or an electrical umbilical means wherein the signal inserted in the control console is transmitted to the respective balance circuits. Both the horizontal and vertical balance circuits 52 and 53 are capable of indicating horizontal or vertical unbalance to a control circuit via conductors 54 and 55, respectively. Control circuit 56 responds to signals representative of circuit unbalance transmitted via 54 and 55 to impart a horizontal drive or vertical drive to the mobile carrier by means of the horizontal drive means 57A or vertical drive means 57B or both, by way of suitable connectors 58 and 59. Conductors 60 and 61 provide circuit completion between the control circuit 56 and the control console 15, and conductors 62 and 63 provide return circuitry to the control console from the horizontal and vertical balance circuits respectively.

FIGS. 3 and 3A show a detailed circuit diagram of both the console and the carrier, providing a means for controlling the position of the carrier, according to the invention. A source of power 70 is provided for the system, including remote console 15 and the mobile carrier 13. Main power switch SW1, shown in its normally open position, provides power to the console, when closed, by way of transformer T1. Upon closure of power-on switch SW2 located on the remote console, power is supplied to contactor coil K1 by way of normally-closed power-off switch SW3 and normally-closed contact K2A. Upon energization of contactor coil K1, normally-open contacts K1A, K1B, and K1C are closed to provide incoming power to the carrier. Indicator L1 in parallel with contactor coil K1 provides visual indication that the power to circuit had been applied.

A resistance selective network 71 is provided on the console comprising a plurality of normally-open pushbutton type horizontal position switches SW5 through SW14 for selective insertion into a variable leg of a horizontally positioned bridge network 74 of a predetermined number of a plurality of a series connected resistors R1 through R10 corresponding to the desired horizontal location of the mobile carrier 13.

Similarly, the desired vertical position of the mobile carrier may be preselected by vertical selection network 72 comprising switches SW15 through SW21 for insertion into a variable leg of a vertical-positioning bridge network 75 of a predetermined number of series connected resistors R11 through R17 corresponding to the desired vertical position of the mobile carrier 13.

It can be seen that the horizontal-positioning bridge network 74 comprises three legs of fixed resistance: R20, R21 and R22 mounted on the carrier and forming three legs of the bridge. The fourth or variable leg of the bridge leg is positioned between one of the terminals of R22 and one of the terminals of R20 by way of sliding contact SC7, the series resistance comprising R1, R2, etc. according to which of the switches SW5 through SW14 has been actuated, plus the amount of resistance placed in the variable leg by movement of the carrier along a bus bar comprising a plurality of separated series connected resistors R31 through R40 by the sliding contact SC8.

A suitable source of D-C power supply is provided on the carrier at 73 and may comprise a D-C source, or a rectified A-C source.

By way of illustration, assume that resistors R1 through R10 are each 500 ohms and that fixed resistors R20, R21, and R22 are 5,000 ohms. It should be noted that many combinations of resistances are possible and within the scope of the invention. It can be seen that for the bridge to balance, the variable leg must also comprise a total resistance of 5,000 ohms. Polarity-sensitive relay coil or micropositioner K9, actuates the mobile carrier in a horizontal direction, through control circuitry to be hereinafter discussed, in accordance with a signal representative both as to magnitude and polarity which appears across K9 as a result of bridge unbalance. It can thus be seen that the signal which appears across K9 is related to any unbalance of the system resulting from a horizontal preaddress.

Moreover, assume that it is desired to preaddress the mobile carrier to bay 05 for example. Accordingly, SW9 is closed, thus inserting series connected resistors R1 through R5 into the variable leg for a total of 2,500 ohms. Assuming further that the mobile carrier is at the head end of the aisle, no further resistance will appear in the leg as a result of the relationship of sliding contactor SC8 and separated resistances of segments of the bus bar, namely R31 through 40. Accordingly, an unbalance in the bridge will exist across the polarity-sensitive relay coil or micropositioner K9 causing the mobile carrier 13 to be driven horizontally along the aisle for any one period.

As the sliding contactor SC8 traverses a given amount of distance, it repetitively traverses resistive segments of the associated bus bar in a manner which selectively inserts an additional amount of resistance in a variable leg of the bridge. It can be understood that as the carrier maneuvers horizontally, resistors R31, R32, etc. are added to the circuit. Since the position bay 05 is desired, SW9 has been closed to preaddress the horizontal carrier to this position, and resistors R1 to R5 comprising 2,500 ohms have been selectively inserted into the bridge, it can be seen that the bridge will need 2,500 additional ohms of resistance to balance, under the assumptions as stated. Accordingly, resistors R31 through R35 are added to a variable leg by sliding contact SC8, in an amount totaling an additional 2,500 ohms.

The total of the resistance in the control console comprising resistors R1 through R5 in series with resistors R31 through R35 comprises the required amount of resistance for balance and accordingly, upon reaching the point along the bus bar wherein the bridge is in balance, no potential appears across micro-positioner K9 and the horizontal movement of the carrier ceases.

It can be understood that resistors R31 through R40 are selectively inserted in separated segments of the bus bar and correspond in number to the required number of bays. For the system described, resistors R1 through R10 and resistors R31 through R40 correspond to a warehousing system having ten horizontal locations. It will be apparent that for more extensive systems, an increased number of resistors in both the control console and along the bus bar are required, in accordance with the number of possible horizontal positions. Similarly, at the control console, the switches are numbered in accordance with the desired bays, SW5 corresponding to bay 05, and SW13 corresponding to bay 09, for example.

In like manner, a bridge comprising fixed legs R45, R46 and R47 is mounted on the mobile carrier 13 having a vertical micro-positioner or polarity-sensitive relay coil K10 mounted thereon. By way of illustration, the number of vertical levels available for selection is shown as different from the number of horizontal levels. In the instant embodiment, assume that resistors R11 through R17 are each 500 ohms and that the fixed legs of the bridge 75 comprising resistors R45, R46, and R47 are each 5,000 ohms. It can thus be seen that the variable leg of the bridge 75 from the common junction of K10 and R47 to one end of R45 must likewise, in its balanced condition, comprise 5,000 ohms. Assume that vertical level 5 is desired, thus SW9 is closed, inserting resistances R16 and R17 in the variable leg totalling, 1,000 ohms, it can be seen that for the bridge to become again in balance, an additional 4,000 ohms is needed. If R50 through R56 are each 500 ohms, and level 5 is desired, a total of 2,500 ohms will appear in the vertical mast to be collected by SC6. For balance, then, a fixed resistance in the variable leg comprising a resistor R48 of 1,500 ohms is needed. Similarly, variations in values of resistance throughout the bridge may be necessary, so long as the bridge may be made to balance at the desired position of the carrier.

Assuming that the mobile carrier 13 is initially positioned at its pick-up and discharge point 14, the bridge unbalance which appears across the polarity-sensitive relays or micro-positioners K9 and K10 will close normally open forward travel contact K9A and normally open upward travel contact K10A to provide forward horizontal travel and upward vertical travel. The closure of contact K9A energizes forward travel relay coil K11 by way of normally closed contact K12A. Simultaneously, the closure of normally open up-travel contact K10A activates up-travel relay coil K13 by way of normally closed contact K14A.

In response to the energization of coils K11 and K13, normally open contacts K11B and K11D as well as normally open contacts K13B and K13D are closed. Closure of contacts K11B and K13D thus activates received command relay coil K19.

In response to the energization of received command relay coil K19, normally open contacts K19A, K19B, and K19C are closed. The closure of normally open contact K19C by way of sliding contactor SC3 energizes command received relay coil K6 on the remote console.

In response to the energization of command received relay coil K6, normally closed contact K6A opens, and normally open contacts K6B and K6C close. Accordingly, visual indicator L2 on the remote console indicates that the carrier has received the command by means of the closure of normally open contact K6C through normally closed contacts K3A and K7A.

Upon an indication that the command has been received by the carrier, switch SW4 is actuated to initiate traversing by the carrier. When switch SW4 is actuated, in-process relay coil K3 is energized through normally closed contact K4B and normally open contact K6B which had been previously closed in response to the actuation of the command received relay K6. Normally open contact K3E also closes in response to the energization of in-process relay coil K3 to maintain coil K3 at an energized state, and thus bypassing SW4.

Accordingly, the power is supplied to a start signal relay coil K17 and relay coil K18 on the carrier by way of sliding contactor SC4, normally open contact K19A which had closed in response to the previous energization of received command relay K19 and through normally closed contact K18A.

In response to the energization of start signal relay coil K17, in parallel with K18, normally open contact K17A, K17B, K17C and K17D are closed, K17A provides a holding circuit for coil K17 through normally closed contact K16A.

Energization of coil K18 after a slight time delay, opens normally closed contact K18A and closes normally open contact K18B. Thereafter, start signal relay coil K17 and coil K18 remain energized by way of normally closed contact K16A and normally opened contact K17A which had previously been closed in response to the energization of the coil K17.

Upon the energization of normally open relay contacts K17D and K18B, incoming power 70 is supplied by way of switch SW1 and transformer T2 by way of the overload relay contacts OL1 through OL4 to energize forward contactor coil K20 and the upward contactor coil K22. In response to the energization of coils K20 and K22, normally open contacts K20A, K20B, and K20C close actuating the forward travel positioning means $M_H$. Simultaneously, normally open contacts K22A, K22B and K22C close in response to the energization of contactor coil K22 to activate the upward travel positioning means $M_V$.

Horizontal movement of the carrier moves sliding contactor SC8 and the resistance segments R31 to R40 of the bus bar to insert the desired amount of resistance in the variable leg of the bridge as hereinbefore described. Simultaneously, vertical movement of the carrier in response to the activation of the $M_V$ moves sliding contactor SC6 along the vertical resistance segments to insert the desired amount of resistance in the variable leg of the vertical positioning bridge as hereinbefore described.

Upon reaching the desired horizontal and vertical location, no potential continues to exist across polarity sensitive relays or micro-positioners K9 and K10. Accordingly, coils K9 and K10 are de-energized thereby deactivating $M_H$ and $M_V$ to cease movement of the mobile carrier 13.

Thus far, the circuit has been described in terms of initiation of control of the carrier when the carrier is located in its home position, wherein the horizontal and vertical positioning responses require a forward and upward movement of the carrier. It will also be seen that where the mobile carrier is positioned at a horizontal location beyond the desired address both in a horizontal and vertical position, that the amount of resistance in the variable leg will be in excess of that desired in both the vertical and horizontal positioning bridge and, accordingly, the polarity across the micro-positioners contacts K9 and K10 will be reversed.

It can be seen since the resistors R21 and R22 are across the source of DC voltage in the horizontal-positioning circuit, an excess resistance is placed in the variable leg of the bridge, and added to the fixed resistor R20 so that, the voltage at the junction of R20 and coil K9 is less than that at the junction of R22 and R21. Accordingly, since K9 is a polarity sensitive micropositioner, a reverse polarity across coil K9 and similarly across K10, opposite to the situation hereinbefore described, will activate normally open contacts K9B and K10B, comprising the reverse travel contact and the down travel contact, respectively.

Closure of normally open contacts K9B and K10B results in an energization of reverse travel relay coil K12 through normally closed contact K11A. Similarly, upon closure of normally open down travel contact K10B, down travel relay coil K14 is energized by way of normally closed contact K13A.

It can also be seen that the forward and reverse positioning of the carrier are exclusive in that in the reverse direction, energization of the coil K12 opens normally closed contact K12A in the forward circuit.

On the contrary, when operating in the forward direction, energization of coil K11 opens normally closed contact K11A in the reverse circuit, so that simultaneous forward and reverse commands are precluded. Similarly, energization of coil K13 in the up-command circuit opens normally closed contact K13A in a down-command circuit, and vice versa, energization of down travel relay coil K14 opens normally closed contact K14 in the up travel circuit, thus providing a similar interlock between the up and down commands.

In response to the energization of coils K12 and K14, normally open contacts K12B and K14B are closed, thus energizing received-command relay coil K19, and the circuit proceeds to activate as hereinbefore described.

Upon closure of normally open contacts K17D and K18B as hereinbefore described, contact coils K21 and K23 are energized by way of the overload relay contact as hereinbefore described. Accordingly, normally opened contacts K21A, K21B, and K21C close activating the reverse travel positioning means $M_H$. Similarly, in response to the energization of contact coil K23, normally open contacts K22A, K22B, and K22C close activating the vertical positioning means $M_V$ in a downward direction. As can be understood, reverse or downward direction of the mobile carrier proceeds until the bridge becomes in balance according to the principles hereinbefore enumerated, until both the vertical positioning and the horizontal positioning bridge become in balance whereupon both horizontal and vertical movements of the carrier cease.

By analogy, it can further be understood that any combination of positional actuation of the carrier is possible. For example, the carrier is capable of achieving forward horizontal motion and downward vertical motion, or reverse horizontal and upward vertical motion by selective actuation of either coil K11 or K12 and one of the coils K13 and K14. It can be seen that the connections of normally open contacts K11B and K13B with K12B and K14B and the common connection therebetween provide actuation of coil K19 for any combination of horizontal and vertical movement.

It can be seen that upon completion of the command, whichever of relay coils K11, K12, K13 or K14 is deactivated, corresponding contacts K11C, K12C, K13C or K14C, return to their normally closed state. Since start signal relay coil K17 remains enregized, contact K17C is closed, thus energizing command-complete relay coil K15. In response to energization of command-complete relay coil K15, normally closed contact K15A opens. Since upon completion of the command, relay coils K11, K12, K13 and K14 have been de-energized, associated contacts K11B, K12B, K13B and K14B are returned to their normally open stages, thus de-energizing coil K19.

In response to the de-energization of coil K19, normally open contacts K19A and K19B return to their original state, thus de-energizing the command received relay coil K6, causing the extinguishment of indicating means L2.

Energization of coils K15 and coil K16 results in the closure of normally open contacts K16B. Since the in-process relay coil K3 had previously been energized, normally open contact K3D is closed, thus energizing command complete relay coil K7.

In response to energization of command complete relay coil K7, normally closed contact K7A opens extinguishing the visual indicating means L2, the command-received indicator. Normally open contacts K7B and K7C are also closed, energizing L4 by way of normally closed contact K4A to visually indicate at L4 that the command is complete.

S30 and S31 represent a push-button, solenoid-closed, normally open contactor which closes when a command is placed upon either or both of the command registers 71 and 72. Thus, when contact K7C closes, the timed register relay coil K5 is energized.

Energization of coil K5 causes normally open contact K5A to be closed after a suitable period of time to energize readdress coil K4 through solenoid contact S31 which had been closed in response to a preaddress command as previously described. Energization of coil K4 opens contact K4A, extinguishing command-complete light L4 and energizing readdress light L5 to show that the circuit is capable of receiving a new address command.

Modifications and additions to the circuit may be made where additional features or functions are desired. For example, the circuit may also contain safety provisions for misaligned or projecting loads on the carrier comprising normally open contacts M1 or P1 which when closed due to a misaligned or projected load, energize safety relay coil K8 closing normally open contact K8A on the console, thus energizing safety coil K2 which opens the normally closed contact K2A cutting off the power to both the console and to the motor carrier since normally open contacts K1A and K1B and K1C return to their normally open state.

Upon completion of the command and indication of the readdress indicator L5, a new command may be provided to the carrier at any position of the carrier to perform the same operations as hereinbefore described.

Power and control of the mobile carrier 13 have been depicted in FIGS. 3 and 3A by means of sliding contactor SC1 through SC10 in conjunction with relatively fixed power and control conductors. However, alternative means may be used to accomplish the same functions, such as electrical umbilical arrangements and the like.

Figure 4A:
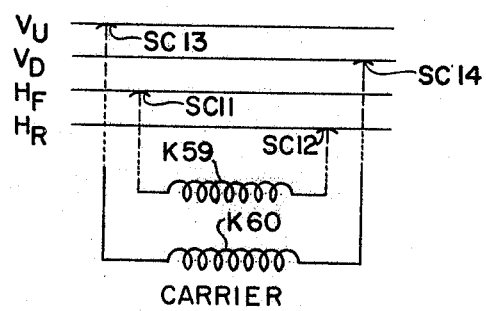

FIGS. 4 and 4a depict an alternative embodiment wherein the bridge circuits 74 and 75 in FIG. 3a are mounted at the remote location on the remote console 15. It can be understood that the control, power and indication circuitry of FIGS. 3 and 3a remain essentially the same with the exception that the bridges 74 and 75 are repositioned at the remote location.

A suitable source of D-C potential, for example, rectified A-C, is shown at 76. Horizontal positioning bridge 74 is shown at the remote location as comprising resistors R20, R21 and R22, as in FIG. 3a. Polarity-sensitive relay coil 49 appears across a diagonal of the bridge, similar to the manner of coil K9 in FIG. 3a. The variable leg of the horizontal positioning bridge 74 includes horizontal selection network 71 and suitable conductors to sliding contactor SC8 on the carrier. A common lead is provided to sliding contactor SC7 on the carrier, similar to the manner of FIG. 3a, so that it is clear that the variable leg of the horizontal positioning bridge 74 appears between sliding contactors SC7 and SC8. As previously described, movement on contactor SC8 varies the resistance in a variable leg of a brige 74 to effect a balance by insertion or deletion of resistors R31 to R40 according to movement of the carrier.

Vertical positioning bridge 75 has likewise been removed from the carrier and placed at the remote console location, and comprises resistors R45, R46 and R47, in a manner shown in FIG. 3a. By way of illustration, resistor R48 has been omitted, it being assumed that the parameters of the vertical bridge locating network 75 may be properly selected to achieve the desired balance at the desired location. The variable leg of the bridge passes by way of suitable conductors to the vertical location selection network 72 to the sliding contactor SC5 on the carrier. It can be seen that the variable leg of the vertical positioning bridge 75 appears between the conductors and associated sliding contactors SC5 and SC7.

In response to an unbalance of horizontal bridge 74, as hereinbefore described, potential appears across a polarity-sensitive relay coil K49. Normally open contacts K49A and K49C close in response to an unbalance of a given polarity across coil K49 requiring a reverse travel for the carrier in the horizontal direction. Similarly, K49B and K49D close in response to an unbalance of the opposite polarity across coil K49, requiring a forward travel of flow. Assuming that the desired horizontal location of the mobile carrier would require forward movement of the carrier, normally open contacts K49B and K49D close while K49A and K49C remain open, thereby establishing a positive polarity on conductor $H_F$ and $H_R$, which are suitably continued to the carrier, as shown in FIG. 4a, for reception by sliding contactors SC11 and SC12. A polarity-sensitive relay K59 on the carrier, poled so as to impart forward motion to the carrier under the assumptions stated, is provided across $H_F$ and $H_R$ by way of SC11 and SC12. Upon energization of K59, which corresponds to the energization of K9 in FIG. 3a, to impart a forward motion to the carrier, normally-open contact K9A of FIG. 3a closes, and the control circuit operates as described therein.

Similarly, where the desired horizontal location requires a reverse movement of the carrier, normally open contacts K49A and K49C close, while K49B and K49D remain open, to reverse the relative polarity of $H_F$ and $H_R$, causing coil K59 to activate contact K9B in the manner that K9 activates K9B in FIG. 3a to impart a reverse movement of the carrier.

In like manner, an unbalance of the variable leg of the vertical bridge network 75 provides a polarity across micropositioning or phase sensitive relay coil K50, thus closing either normally open contacts K50B and K50D to provide an upward motion of the carrier or K50A and K50C to provide a downward motion of the carrier.

Control signals $V_U$ and $V_D$ are also transmitted to the remote carrier to be received by polarity-sensitive relay coil K60 by way of sliding contactors SC13 and SC14. Since the operation of the normally-open contactors K50A through K50D in response to a signal of a given polarity across coil K50, is like that described with respect to K49A through K49D, a detailed explanation is not believed to be necessary.

Polarity-sensitive relay K60 receives the vertical motion command on conductors $V_U$ and $V_D$ by way of sliding contactors on the carrier and corresponds to the phase-sensitive relay K10, shown in FIG. 3a, which will actuate either of K10A or K10B in accordance with the desired motion of the carrier. The description of the operation of the circuit contained thereat thus becomes applicable for the embodiment shown in FIGS. 4 and 4a.

It may be understood that various means for inserting the desired horizontal and vertical locations into the selection networks 71, 72 are possible including human operation, programmed operation by way of punch cards, or tape, and the like.

It is not my intention that the illustrated embodiment nor the terminology employed in describing it be limiting inasmuch as variations in these may be made without departing from the spirit of the invention. Rather I desire to be restricted only by the scope of the appended claims.

The invention claimed is:

1. In a material handling arrangement of the type including a control location and a mobile carrier, the improvement comprising means for remotely and automatically controlling the position of said mobile carrier, said means comprising:
   a bridge network comprising at least two adjacent legs of fixed resistance and at least one leg of variable resistance,
   said one leg of variable resistance comprising a first means located at a position remote from said mobile carrier for varying the resistance in said one leg of variable resistance as a function of the desired position of the mobile carrier,
   a first polarity-sensitive means mounted on said carrier for controlling movement of said carrier when said bridge is unbalanced due to a change in the resistance in said one leg by actuation of said first means, the direction of movement of said carrier being in accordance with the polarity across said polarity-sensitive means, and
   second means for varying the resistance of one of said legs of variable resistance of said bridge as a function of movement of said carrier in a direction tending to return said bridge to balance, whereby movement of the mobile carrier ceases upon a balance of said bridge circuit.

2. The means as defined in claim 1, wherein said legs of fixed resistance are mounted on said carrier.

3. The means as defined in claim 1, wherein said second means comprises resistance elements along a bus bar.

4. The means as defined in claim 1, wherein said second means comprises resistance elements mounted on said carrier.

5. The means as defined in claim 1, wherein said legs of fixed resistance are mounted at a position remote from said carrier,
   second polarity-sensitive means connected across a diagonal of said bridge,
   said first polarity-sensitive means being responsive to said second polarity-sensitive means to control movement of said carrier.

6. The means as defined in claim 1, further including:
   circuit means responsive to said first polarity-sensitive means,
   said circuit means comprising means for initiating movement of said carrier when said bridge is in an unbalanced condition, and
   means for ceasing movement of said carrier when said bridge is in a balanced condition.

7. In a material handling arrangement of the type including a control location and a mobile carrier, the improvement comprising means for remotely and automatically controlling the position of said mobile carrier, said means comprising:
   a bridge network including three legs of fixed resistance and a fourth leg of variable resistance,
   means for positioning said carrier,
   said positioning means including polarity-sensitive means mounted across a diagonal of said bridge and responsive to unbalance of said bridge,
   said variable leg including first and second portions,
   said first portion including means for changing the resistance in said first portion by a predetermined amount in accordance with the desired position of the carrier, the change in resistance in said first portion causing said bridge to become unbalanced,
   said second portion including means for varying the resistance in said second portion in response to movement of said carrier in an amount tending to return said bridge to balance, said movement being caused by said means for positioning said carrier, whereby movement of the carrier is in response to an unbalanced condition across said bridge and ceases when the bridge returns to a balanced condition.

8. The means as defined in claim 7, wherein said legs of fixed resistance are mounted on said carrier.

9. The means as defined in claim 7, wherein said means included within said first portion comprises resistance segments along a bus bar.

10. The means as defined in claim 7, wherein said means included within said second portion comprises resistance segments mounted on said carrier.

11. The means as defined in claim 7, wherein said legs of fixed resistance are mounted at a position remote from the carrier,
    second polarity-sensitive means connected across the diagonal of said bridge,
    said first polarity-sensitive means being responsive to said second polarity-sensitive means.

12. The means as defined in claim 7, further including:
    circuit means responsive to said first polarity-sensitive means,
    said circuit means comprising means for initiating movement of said carrier when said bridge is in an unbalanced condition, and
    means for ceasing movement of said carrier when said bridge is in a balanced condition.

13. Means for simultaneously positioning a mobile carrier in an automated warehousing system in both the vertical and horizontal directions comprising:
    a first bridge network including at least two adjacent legs of fixed resistance and at least one leg of variable resistance,
    polarity-sensitive means across a diagonal of said first bridge,
    means for varying the resistance of said one leg of variable resistance of said first bridge network in accordance with the desired horizontal position of the carrier, said means being located at a position remote from said carrier,
    a second bridge network comprising at least two adjacent legs of fixed resistance and at least one leg of variable resistance,
    a second polarity-sensitive means mounted across a diagonal of said second bridge,
    means for varying the resistance of said one leg of variable resistance of said second bridge network in accordance with the desired vertical position of the carrier, said means being located at a position remote from said carrier,
    means for moving said mobile carrier horizontally in response to and in a direction determined by the potential across said horizontal positioning means,
    means for moving said mobile carrier vertically in response to and in a direction determined by the potential of unbalance across said vertical positioning means,
    means for varying the resistance of a variable leg of said first bridge network in accordance with the horizontal position of said carrier in a direction tending to return said first bridge to a balanced condition, whereupon horizontal movement of the carrier ceases, and
    means for varying the resistance of a variable leg of said second bridge network in accordance with the vertical position of said carrier in a direction tending to return said second bridge to a balanced condition whereupon vertical movement of the carrier ceases.

14. Means for remotely controlling the position of a mobile carrier in an automated warehousing system comprising:
    a first bridge network, including a first point of fixed reference potential and a first point of variable potential, a first polarity-sensitive means connected between said first points of fixed and variable potential, a first means responsive to said first polarity-sensitive means for moving said carrier in a direction determined by the polarity of the potential at said first point of variable potential relative to the potential at said first point of fixed potential, a second means for varying the potential at said first point of variable potential from a position remote from the carrier in accordance with the desired position of the carrier, a third means responsive to movement of said carrier for varying the potential at said first point of variable potential in a direction tending to equalize the potential at said first fixed and variable points.

15. The means as defined in claim 14 further comprising:

a second bridge network, including a second point of fixed reference potential and a second point of variable potential, a second polarity-sensitive means connected between said second points of fixed and variable potential, a fourth means responsive to said second polarity-sensitive means for moving said carrier in a direction determined by the polarity of the potential at said second point of variable potential relative to the potential at said second point of said fixed potential, a fifth means for varying the potential at said second point of variable potential from a position remote from the carrier in accordance with the desired position of the carrier, a sixth means responsive to movement of said carrier for varying the potential at said second point of variable potential in a direction tending to equalize the potential at said second fixed and variable points, whereby said first bridge network controls the horizontal movement of said carrier, and said second bridge network controls the vertical movement of said carrier.

References Cited

UNITED STATES PATENTS

| | | | |
|---|---|---|---|
| 2,384,622 | 9/1945 | Isserstedt | 318—29 |
| 2,828,481 | 3/1958 | Latapie | 318—29 XR |
| 2,897,426 | 7/1959 | Hotine | 318—28 |
| 2,938,154 | 5/1960 | Kirschbaum | 318—29 |
| 3,010,059 | 11/1961 | McLaughlin et al. | 318—29 XR |
| 3,046,411 | 7/1962 | Steiner | 318—29 XR |

B. DOBECK, Primary Examiner

U.S. Cl. X.R.

214—16.4; 318—28, 29